(12) United States Patent
Simon

(10) Patent No.: US 8,185,301 B1
(45) Date of Patent: May 22, 2012

(54) AIRCRAFT TRAFFIC AWARENESS SYSTEM AND METHODS

(75) Inventor: Jeffrey M. Simon, Sudbury, MA (US)

(73) Assignee: Honeywell International Inc., Morristown, NJ (US)

( * ) Notice: Subject to any disclaimer, the term of this patent is extended or adjusted under 35 U.S.C. 154(b) by 774 days.

(21) Appl. No.: 11/781,262

(22) Filed: Jul. 22, 2007

Related U.S. Application Data

(60) Provisional application No. 60/833,462, filed on Jul. 26, 2006.

(51) Int. Cl.
  G05D 1/02 (2006.01)
  G06F 17/10 (2006.01)
  G06G 7/78 (2006.01)

(52) U.S. Cl. .......... 701/300; 701/14; 701/301; 340/945; 340/961; 340/980

(58) Field of Classification Search .................. 701/301, 701/3, 4, 11, 12, 14, 18; 340/945–983
See application file for complete search history.

(56) References Cited

U.S. PATENT DOCUMENTS

| | | | |
|---|---|---|---|
| 2,784,307 A | 3/1957 | Burton | |
| 3,605,083 A | 9/1971 | Kramer | |
| 3,643,213 A | 2/1972 | Yurasek et al. | |
| 3,711,826 A | 1/1973 | La Russa | |
| 3,784,969 A | 1/1974 | Wilckens et al. | |
| 3,786,505 A | 1/1974 | Rennie | |
| 3,789,356 A | 1/1974 | Harenberg, Jr. et al. | |
| 3,843,554 A | 10/1974 | Aykan et al. | |
| 4,057,782 A | 11/1977 | Muller | |
| 4,316,252 A | 2/1982 | Cooper | |
| 4,368,517 A | 1/1983 | Lovering | |
| 4,419,079 A | 12/1983 | Georges et al. | |
| 4,419,731 A | 12/1983 | Puffett et al. | |

(Continued)

FOREIGN PATENT DOCUMENTS

EP 0 399 670 A2 11/1990

OTHER PUBLICATIONS

1st Class Moving Map, Digital Sky, (No Date).

(Continued)

Primary Examiner — Jack W Keith
Assistant Examiner — Rami Khatib
(74) Attorney, Agent, or Firm — Ingrassia Fisher & Lorenz, P.C.

(57) ABSTRACT

The invention provides, in some aspects, aviation navigational systems and methods for cockpit display of traffic information that generate intuitive three-dimensional graphical representations of air traffic (and/or other potential conflicts) in the vicinity of an aircraft in flight, as well as during take-off and landing. These systems and methods provide improved awareness of potential conflicts, offering in the cockpit an immediate understanding of the significance of potential conflicts, e.g., vis-à-vis their nature, direction, and time to visual contact. Thus, according to one aspect of the invention, there is provided an aviation navigational system that generates a 3D representation of the airspace in the vicinity of an aircraft and, relative to that representation, a representation of air traffic in that airspace. In related aspects of the invention, the 3D representation of the airspace is relative to the aircraft position in that airspace, the representation of the air traffic in that airspace is relative to a viewer on that aircraft.

25 Claims, 4 Drawing Sheets

U.S. PATENT DOCUMENTS

| | | | | |
|---|---|---|---|---|
| 4,438,438 | A | * | 3/1984 | Arens et al. .................. 342/451 |
| 4,660,157 | A | | 4/1987 | Beckwith et al. |
| 4,825,374 | A | | 4/1989 | King et al. |
| 4,999,780 | A | | 3/1991 | Mitchell |
| 5,047,942 | A | | 9/1991 | Middleton et al. |
| 5,101,357 | A | | 3/1992 | Tempelhof et al. |
| 5,115,398 | A | | 5/1992 | De Jong et al. |
| 5,343,395 | A | | 8/1994 | Watts |
| 5,355,442 | A | | 10/1994 | Paglieroni |
| 5,566,073 | A | * | 10/1996 | Margolin ....................... 701/213 |
| 5,638,282 | A | | 6/1997 | Chazelle et al. |
| 5,904,724 | A | | 5/1999 | Margolin |
| 6,199,008 | B1 | * | 3/2001 | Aratow et al. ................ 701/120 |
| 6,804,585 | B2 | | 10/2004 | Humbard et al. |
| 6,963,291 | B2 | * | 11/2005 | Holforty et al. ............. 340/945 |
| 6,985,091 | B2 | * | 1/2006 | Price ............................ 340/975 |
| 7,120,540 | B2 | | 10/2006 | Meunier |
| 7,352,292 | B2 | * | 4/2008 | Alter et al. ................... 340/945 |
| 7,463,954 | B1 | * | 12/2008 | He .................................... 701/3 |
| 7,486,291 | B2 | * | 2/2009 | Berson et al. ................. 345/427 |
| 7,492,305 | B1 | * | 2/2009 | Woodell et al. ............ 342/26 B |
| 7,603,209 | B2 | * | 10/2009 | Dwyer et al. ................... 701/14 |
| 7,630,829 | B2 | * | 12/2009 | Pepitone ...................... 701/120 |
| 2002/0069019 | A1 | | 6/2002 | Lin |
| 2003/0025614 | A1 | * | 2/2003 | Kahn ............................ 340/961 |
| 2004/0218910 | A1 | * | 11/2004 | Chang et al. ..................... 386/98 |
| 2005/0007386 | A1 | * | 1/2005 | Berson et al. ................. 345/633 |
| 2006/0095475 | A1 | * | 5/2006 | Martinez et al. ............. 707/200 |
| 2007/0171094 | A1 | * | 7/2007 | Alter et al. ................... 340/970 |

OTHER PUBLICATIONS

3 SpaceFastrak, Polhemus, Jan. 1994.
Buening, Tactical Mapping in Combat Aircraft, IEEE, 5 pages, 1998.
Gallant, "System revolutionizes surveying and navigation", EDN, pp. 31-42, Jan. 7, 1993.
GPS 100 AVD Personal Navigator, Garmin International, Inc., 1991.
Hard Drivin, Atari Games Corp., 1988.
Jacobs et al., "Fractal Image Compression Using Iterated Transforms: Applications to DTED", NCCOSC RDT&E Div., pp. 1122-1128, Oct. 11, 1992.
Jeppensen Master Dabase, NavaData (undated).
KNS80 Integrated NAV System, Bendix/King, Apr. 1989.
Lyons, et al., "Some Navigational Concepts for Remotely Piloted Vehicles", Agard Conference Proceedings, Aug. 1976 (15 pgs.).
Magellan GPS Map 7000, Jan. 1999.
Pasman, W. et al., "Implementation of an Augmented Reality System on a PDA," Proc. ISMAR 2003, Tokyo, Japan, (Nov. 4-7, 2003).
Patrick, et al., "ITARS Robust Demonstration System Integration", IEEE, pp. 83-87, 1988.
Raymer, et al., "Advanced Terrain Data Processor", IEEE, pp. 636-639, 1994.
"Steel Talons", Atari Games Corp., 1991.
Trimble Navigation TNL 1000 GPS Navigator 1992 Pilot Guide, 2 pages.
Uijt De Haag, M. et al., "Terrain Database Integrity Monitoring for Synthetic Vision Systems," IEEE Trans. Aerospace & Electronic Sys. 41:386-406 (Apr. 2005).
U.S. GeoData Digital Line Graphs, U.S. Dept. of the Interior, 12 pages, Jun. 1993.
US GeoData Digital Elevation Models, U.S. Dept. of the Interior, 6 pages, Jun. 1993.
Vadlamani. A. et al., "Improved Downward-Looking Terrain Database Integrity Monitor and Terrain Navigation," Proc. IEEE Aerospace Conf. pp. 1594-1607 (Mar. 2004).
Vadlamani. A. et al., "A 3-D Spatial Integrity Monitor for Terrain Databases," Proc. 23d IEEE/AIAA Digital Avionics Systems Conf. (DASC) p. 4.C.2-1-4.C.2-13 (Oct. 2004).

* cited by examiner

AIRCRAFT TRAFFIC AWARENESS SYSTEM AND METHODS

This application claims the benefit of priority of U.S. Provisional Patent Application Ser. No. 60/833,462, filed Jul. 26, 2006, entitled "Aircraft Traffic Awareness System and Methods," the teachings of which are incorporated herein by reference.

BACKGROUND OF THE INVENTION

The present application pertains to aviation navigational systems and methods, and, more particularly, to improved systems and methods for cockpit display of traffic information. Such systems and methods can be used, by way of example, for real-time display of potential air traffic conflicts and collision avoidance.

Aviation navigational systems allow a pilot to determine an aircraft's heading, altitude and position, e.g., vis-a-vis navigational beacons, the global positioning system or otherwise.

More advanced systems also display air traffic in the vicinity of the "host" aircraft. These displays typically provide a radar scope-like arrangement concentric circles indicating distance to potential traffic conflicts (e.g., oncoming aircraft, slower moving aircraft, and so forth), with triangles or other symbols indicating the general direction of those conflicts relative to the host craft's current heading. Symbols displayed within the innermost circles are closer to the craft; those in outermost ones are further away.

A problem with these displays is that they provide to the pilot little intuitive feel for the nature or immediacy of the conflict. Rather, the pilot of the host aircraft must "read" the display and discern the significance of the potential conflict in terms of its nature, direction, and time to visual (or other) contact. Under conditions of poor visibility, this can be problematic.

Some aviation navigational systems also display the host craft position relative to a pre-determined flight route and/or relative to the geography over which it is flying. These displays are typically two-dimensional (2D), though, increasingly the marketplace offers three-dimensional (3D) displays. One such system is the VistaNav™ flight navigation system, commercially available from the assignee hereof, that displays real-time, synthetic three-dimensional (3D) images of the airspace and terrain in the vicinity of an aircraft in-flight, as well as during take-off and landing.

Though systems such as VistaNav™ represent a significant advance in aviation navigational systems, there remains room for improvement. Such is an object of this invention.

More generally, an object of this invention is to provide improved methods and apparatus for aviation navigation.

Further objects of the invention are to provide such methods and systems for improved cockpit display of traffic information.

Yet further objects of the invention are to provide such methods and systems as for real-time display of potential air traffic conflicts and collision avoidance.

Still other objects of the invention are to provide such methods and systems as can be readily understood by pilots, copilots, navigators and others.

SUMMARY OF THE INVENTIONS

The foregoing objects are among those attained by the invention which provides, in some aspects, aviation navigational systems and methods for cockpit display of traffic information that generate intuitive three-dimensional graphical representations of air traffic (and/or other potential conflicts) in the vicinity of an aircraft in flight, as well as during take-off and landing. These systems and methods provide improved awareness of potential conflicts, offering in the cockpit an immediate understanding of their significance, e.g., vis-à-vis their nature, direction, and time to visual contact (or otherwise).

Thus, according to one aspect of the invention, there is provided an aviation navigational system that generates a 3D representation of the airspace in the vicinity of an aircraft and, relative to that representation, a representation of air traffic (and other potential conflicts) in that airspace. In related aspects of the invention, such a system generates the 3D representation of the airspace in the vicinity of the aircraft from the perspective of a viewer on the aircraft and, more particularly, a viewer in the cockpit. Such a representation can be, for example, a synthetic 3D image of the airspace as it would appear (e.g., under actual or ideal weather conditions) to such a viewer.

In further related aspects of the invention, a system as described generates the representation of air traffic in the vicinity of a host aircraft from the perspective a viewer on that aircraft and, more particularly, a viewer in the cockpit. That representation can include, according to related aspects of the invention, one or more indicia of characteristics of the traffic, e.g., relative to the host aircraft or otherwise. Such indicia can include relative direction, relative distance, relative speed, relative rate of climb/descent, size, to name just a few indicia.

By way of example, a system according to these aspects of the invention can generate a 3D representation of airspace ahead of a host aircraft (e.g., as it would appear from the cockpit) including a representation of one or more aircraft that are potential traffic conflicts in that airspace (e.g., oncoming aircraft)—where that latter representation is positioned in the representation of 3D airspace as to indicate a direction to the potential conflict(s) from the perspective of the cockpit of the host aircraft.

Related aspects of the invention provide such a system wherein the representation of the potential traffic conflicts are shaped and sized to indicate the real-world size of the potential conflicts and/or any estimated error in position, direction or size of the conflicts.

Further related aspects of the invention provide such a system wherein the representation of the potential traffic conflicts are colored, shaded or otherwise to indicate a severity of the conflict (e.g., distance, bearing, etc.).

Further related aspects of the invention provide such a system wherein the representation of the potential traffic conflicts are shaped to indicate type or other characteristics of the potential conflicts.

Still other aspects of the invention provide a system as described above which generates a representation of potential conflicts including other aircraft or transient conflicts in the airspace.

Yet still other aspects of the invention provide such a system that generates the representation of airspace in the vicinity of the host aircraft to include a highway in the sky ("HITS") depiction of a projected route of that aircraft.

Yet still other aspects of the invention provide a system as described above which include a processor for generating the aforementioned representations and a display for presenting them to a pilot or other user.

Still other aspects of the invention provide methods paralleling the operations described above.

BRIEF DESCRIPTION OF THE ILLUSTRATED EMBODIMENT

A more complete understanding of the invention may be attained by reference to the drawings, in which.

DETAILED DESCRIPTION OF THE ILLUSTRATED EMBODIMENT

Figure 1:
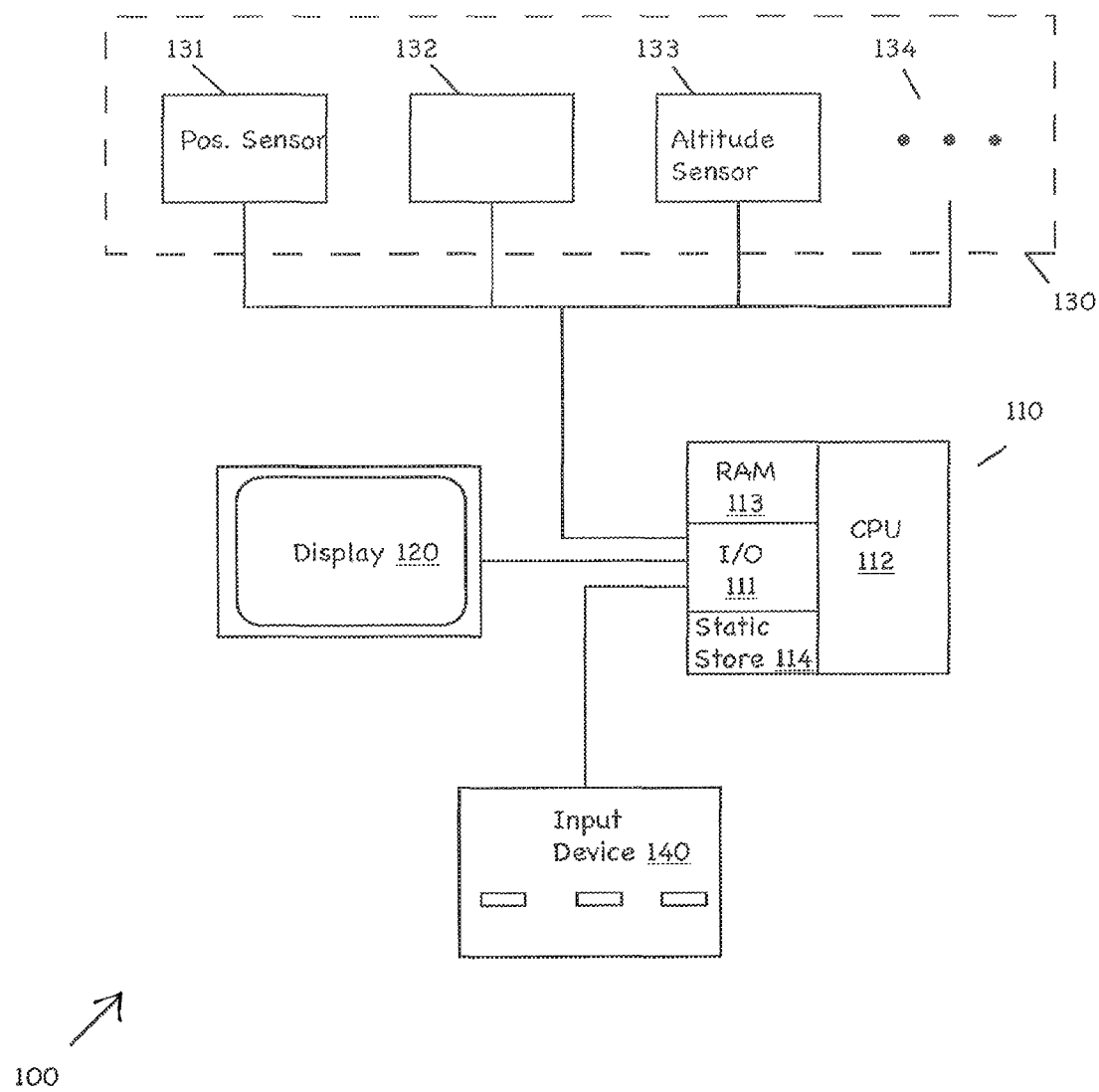
FIG. 1 depicts an exemplary aviation navigational system in accord with the invention.

FIG. 1 depicts an exemplary aviation navigational system 100 according to practice of the invention.

The system 100 includes a display 120 coupled to a processing unit 110, both constructed and operated in accord with flight navigational systems known in the art (for example, in accord with the VistaNav™ multifunction flight display, sold by the assignee hereof, Mercury Computer Systems Inc., of Chelmsford, Mass.)—albeit as adapted in accord with the teachings hereof.

Illustrated processing unit 110 comprises an input/output (I/O) section 111, a central processing unit (CPU) 112, dynamic memory (RAM) 113 and a static store 114, all constructed, interconnected and operated in the conventional manner of general purpose and/or embedded digital data processing devices used in flight navigational systems known in the art—again, as adapted in accord with the teachings hereof.

Static store 114 comprises a CD-ROM, DVD, hard disk and/or other long-term storage device of the type known in the art. This can hold software instructions governing operation of the processing unit 110. In the illustrated embodiment, it also holds a geographic database for use in displaying the geography over which the host aircraft is flying (e.g., mountains, lakes, roads, airports, etc.), as well as a database of aircraft identification codes that can be used to discern information about aircraft and other potential traffic conflicts detected by sensor and apparatus array 130. Thus, by way of example, the store can include data identifying the type, size and/or shape of all aircraft (or other potential traffic conflicts) based on ID.

System 100 can include input device 140, such as a keyboard, touch-pad, or the like, permitting the pilot or other operator to provide inputs for operation of the system.

The system 100 further includes a display 120 (e.g., of the liquid crystal display variety or otherwise) of the conventional type known in the art for dynamic graphical display. The processing unit 110 can drive that display to generate graphical (or other) representations of navigational information such as aircraft position, altitude, heading, speed, attitude, and so forth in the conventional manner known in the art, albeit as adapted in accord with the teachings hereof, e.g., to show such information and related representations for air traffic and other potential traffic conflicts—collectively, hereinafter, "air traffic"—in the oncoming airspace.

In the illustrated embodiment, those other potential traffic conflicts contemplate transient objects and events in the airspace (or on runways), e.g., micro-weather patterns, bird migrations, air shows; however, they may also include conflicts of a less transient nature, e.g., restricted air space, geographic formations (such as mountains), manmade formations (such as buildings), and so forth.

In addition, in the illustrated embodiment, the processing unit 110 drives that display to depict the location of the host aircraft, e.g., along with its flight path, using two- and/or three-dimensional representations of the airspace in the vicinity of the host aircraft and of the geography over which it is flying. As used here, "geography" refers not only to natural features, but also manmade ones, e.g., roads, airports, etc. For sake of simplicity in the discussion that follows, these two- and three-dimensional representations are referred to as being of "the airspace in the vicinity of the host aircraft" or, simply, of "the airspace"—though in other embodiments those representations may be of the geography over which that aircraft is flying, as well (as in the case of the illustrated embodiment), or instead (as in the case of embodiments not shown here).

Figure 2:
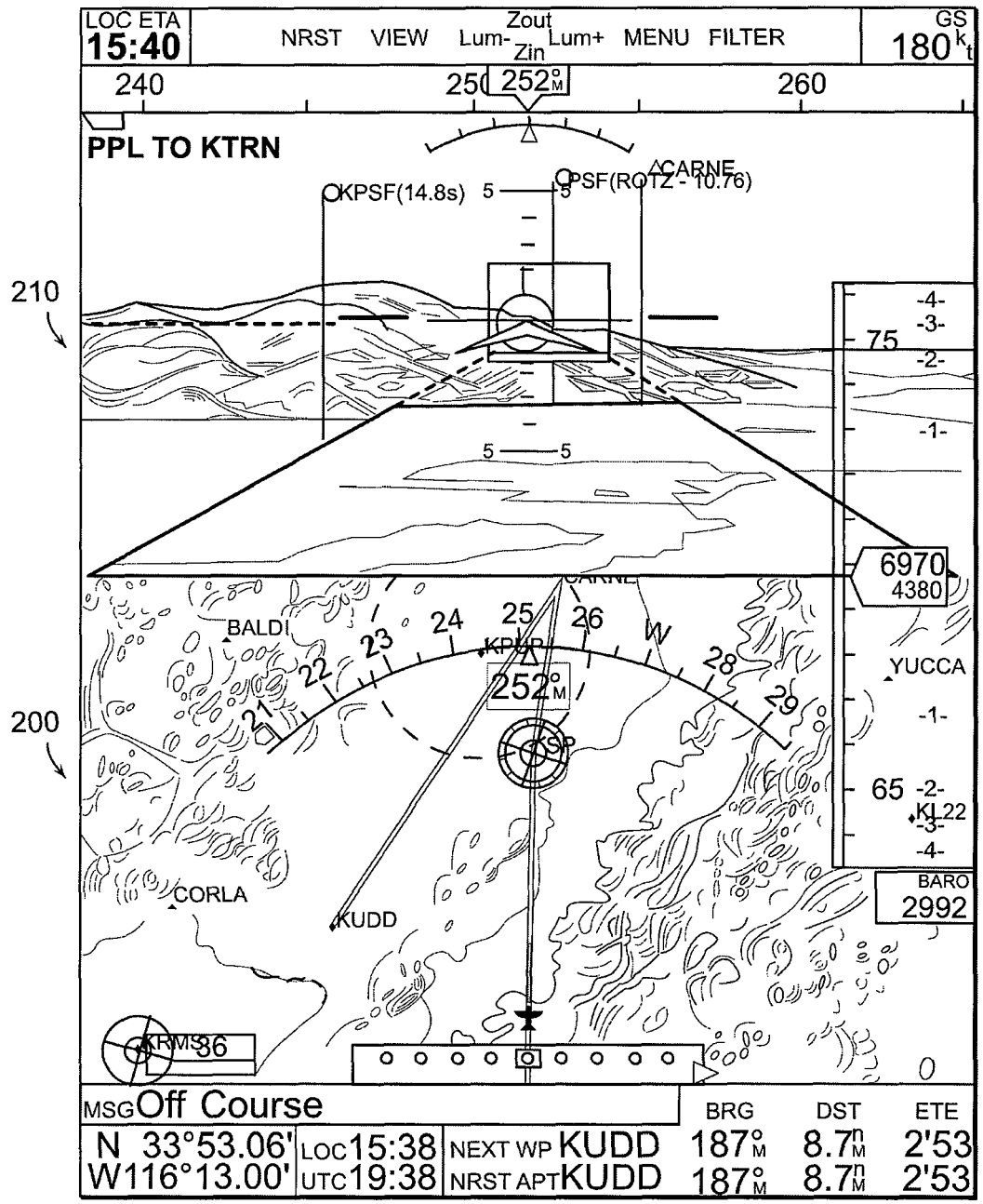
FIG. 2 depicts two- and three-dimensional displays of host aircraft location and/or flight path, along with navigational information.

In the foregoing regards, the system 100, processing unit 110 and display 120 operate in the conventional manner known in the art (and, preferably, in the manner of the aforementioned VistaNav™ flight navigation system), generating a display of the type shown in FIG. 2 that includes one or more of (i) a two-dimensional representation 200 of the host aircraft location and flight path, (ii) a three-dimensional representation 210 of that location in the context of the airspace in the vicinity of the host aircraft, and (iii) graphical and digital representations of navigational information (as evident throughout the illustration). Although depicted here in black-and-white (or grayscale) it will be appreciated that, in preferred embodiments, representations 200, 210, as well as the some or all of the typography and symbols thereon, may be in color.

Alternate embodiments permit depiction of this information in other configurations, as known in the art, e.g., display of a two-dimensional representation only, display of a three-dimensional representation only, display of navigational information only, display of a two-dimensional representation plus navigational information, display of a three-dimensional representation plus navigational information, and so forth, all in the manner known in the art.

In the illustrated embodiment, the aforementioned three-dimensional representation is generated from a designated perspective—here, that of a viewer on the aircraft and, more particularly, a viewer in the cockpit. Other embodiments may use other designated perspectives, e.g., from different vantage points on the aircraft.

Moreover, in the illustrated embodiment, the three-dimensional representation of the airspace in the vicinity of the aircraft is a synthetic 3D image of that airspace as it would appear, e.g., under actual or ideal weather conditions, or otherwise, from the designated perspective; hence, it may not show all airspace in the vicinity of the host aircraft but, rather, only that sector of airspace visible from that perspective). In other embodiments, these representations can be stylized (e.g., to highlight features of interest), wireframe or otherwise.

Referring back to FIG. 1, the system 100 further includes an array of sensors and other apparatus 130 that collect navigational data regarding a host aircraft in which the system 100 is disposed, as well as regarding other aircraft and other potential traffic conflicts in the airspace in the vicinity of the host aircraft. That navigational data includes, by way of example, position, bearing, altitude, speed, attitude, flight path and/or identification, and so forth.

Sensors and apparatus 130 are of the type commonly for collecting this and/or other data useful for cockpit display of traffic information, collision avoidance and so forth in accord with the teachings hereof. Types of sensors and apparatus 130 for gathering this can include position sensor systems 131 (e.g., an antenna for communication with a GPS or LORAN); heading sensor systems 132 (e.g., magnetic heading sources such as compasses and gyroscopes); altitude sensor systems 133; and air traffic control (ATC) transmitter/receiver and other sensing apparatus 134 of the type known and/or useful for collecting the aforementioned data. The array of sensors and apparatus 130 are coupled to the processing unit 110 in the conventional manner shown in the art, e.g., via I/O section 111.

The processing unit 110 can process information from the sensors and apparatus 130 in the conventional manner in order to determine the navigational situation of the host aircraft and of air traffic in its vicinity. This includes determining, to the extent possible and by way of example, for the host aircraft and potential traffic conflicts (whether from aircraft or otherwise) in the oncoming airspace—i.e., that in the path of the host aircraft—one or more of the following parameters, all by way of example: position, altitude, heading, speed, attitude, size, projected flight path, as well as actual or potential errors in the foregoing.

While many of these parameters can be directly discerned by the sensors and apparatus 130, others may be inferred from information gained by those sensors, coupled with information available in the static store 114 and/or obtainable from other sources (e.g., satellite- and/or RF-accessible databases, and so forth).

Thus, for example, the processing unit can discern the size of aircraft (and other potential conflicts) in the oncoming airspace by a database lookup in store 114 keyed on identifications of those craft (and other conflicts) from the sensors and apparatus 130. Likewise, flight paths, impending course changes, and so forth, of those aircraft (and other conflicts) may be obtained from RF-accessible databases maintained by nearby control towers, and so forth. Still further, errors in values sensed by sensors and apparatus 130 or otherwise determined therefrom can be inferred from database lookups, error estimate calculations, and so forth.

Though FIG. 1 depicts an exemplary configuration of an aviation navigational system according to the invention, those skilled in the art will appreciate that other configurations are also possible to carry out the system functionalities described herein. For example, one or more of the components shown in FIG. 1 can be integrated together as a single physical unit (e.g., processing unit 110 and display 120 can be integrated in a notebook computer, a tablet computer, or the like, that can be easily transferred between aircraft) and/or separated into physically distinct objects, such as having the static storage device 114 embodied as a distinct unit that can be electrically coupled to the remainder of the processing unit 110. Furthermore, communications between devices can be through a wired connection (e.g., a wired connection), or by RF or other wireless or remote communication mechanism.

Figure 3:
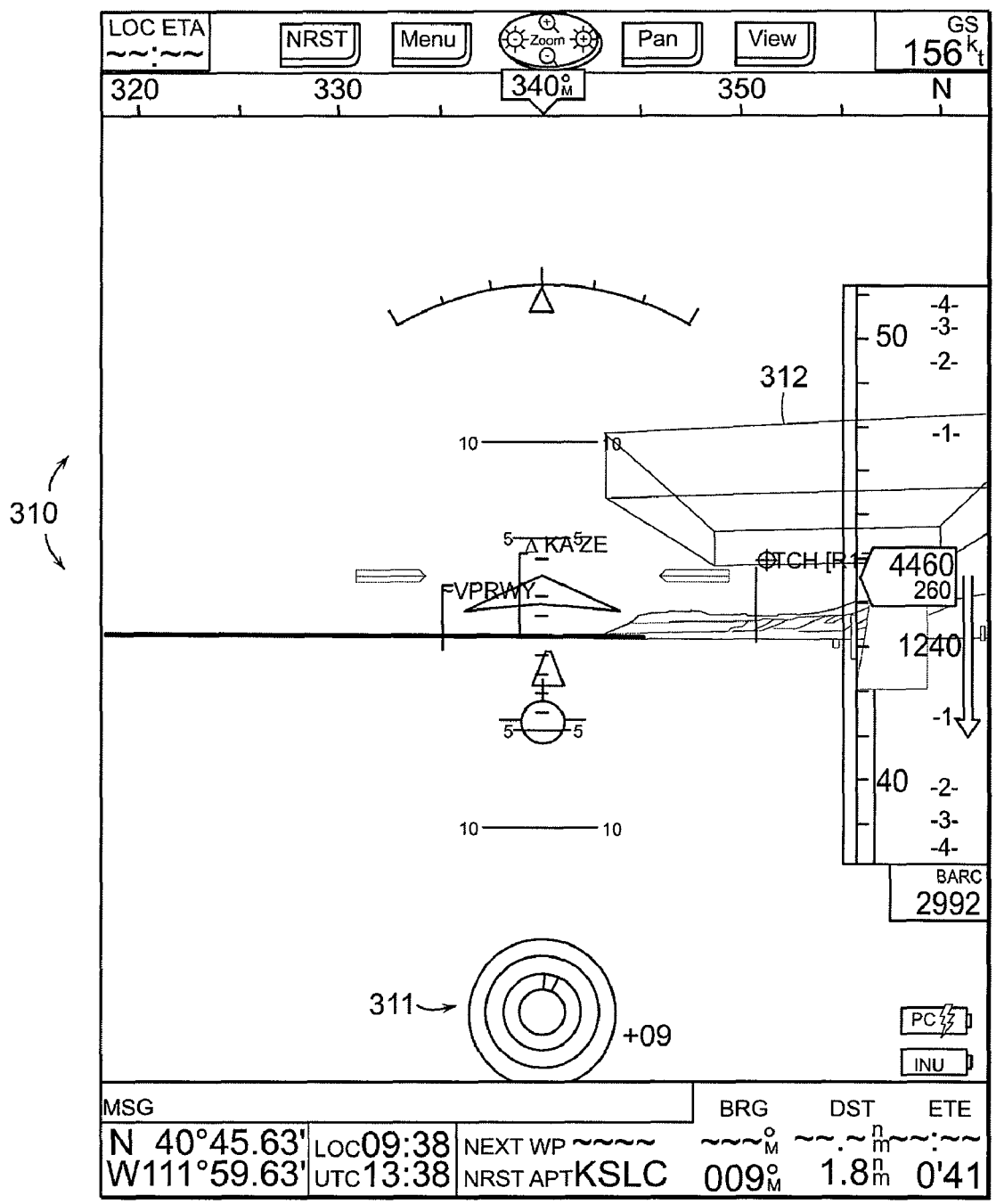
FIG. 3 depicts a display of navigational information and a three-dimensional display of airspace in the vicinity of the host aircraft, along with a representation of air traffic in that airspace, in a system according to the invention.

FIG. 3 depicts a display of the type, driven by processing unit 110, of host aircraft navigational information (e.g., position, altitude, heading, speed, attitude, and so forth), along with a three-dimensional representation 310 of the airspace in the vicinity of the host aircraft, all in a manner discussed above in connection with FIG. 2, albeit, here, sans the two-dimensional representation of aircraft location and flight path. Though not shown in the illustrated embodiment, processing unit 110 can supplement the representation 310 (and/or a corresponding two-dimensional representation of airspace) with a highway-in-the-sky (HITS) graphic, of the type common in the art, depicting the host aircraft's path.

Although depicted here in black-and-white (or grayscale) it will be appreciated that, in preferred embodiments, the representation 310, as well as the some or all of the typography and symbols thereon, may be in color.

As shown in FIG. 3, the processing unit 110 optionally and additionally depicts air traffic in the airspace in the vicinity of the host aircraft using the 2D scope-like representation 311 of concentric circles discussed above in the background of the invention. The processing unit generates that aspect of the display in the conventional manner of the art.

As shown in FIG. 3, the processing unit 110 generates a display so as to depict that air traffic in, and relative to, the depiction of the 3D representation of the airspace itself (and geography). Thus, for example, in FIG. 3, both the 3D representation 310 of the airspace in the vicinity of the aircraft and the representation 312 of one or more elements of air traffic in that airspace are from the designated perspective (here, that of a viewer in the cockpit). In the illustrated embodiment, each single representation 312 is of an individual element of air traffic, e.g., an individual aircraft in the oncoming airspace, and is discussed as such below. However, it will be appreciated that a single such representation 312 can depict a grouping of elements (e.g., a squadron of fighters, a bevy of skydivers or a flock of birds, all by way of example).

As above, in the illustrated embodiment, these representations do not show all airspace and air traffic in the vicinity of the host aircraft but, rather, only those in sectors visible from the designated perspective. Other embodiments may differ in this regard, e.g., displaying potential collisions from the side and/or rear of the host aircraft.

Likewise, as above, the representations of the airspace and air traffic can be synthetic 3D images, depicting these as they would appear (e.g., under actual or ideal weather conditions) to the viewer from the designated perspective. However, one or more of those representations can be stylized (e.g., to highlight features of interest), wireframe or otherwise. Thus, in the illustrated embodiment, the 3D representation 310 of airspace is a 3D synthetic image, while the representation of the traffic is in 3D wireframe.

The representation 312 of air traffic generated by processing unit 110 and displayed on display 120 can include one or more indicia of characteristics of that traffic (here, again, of an individual element of air traffic, such as a oncoming aircraft), e.g., relative to the host aircraft or otherwise. Such indicia can include relative direction, relative distance, relative speed, relative rate of climb/descent, size, to name just a few indicia.

Thus, in the illustrated embodiment, the 3D representation 310 of airspace includes a representation 312 of an approaching aircraft, the latter (representation 312) being positioned within the former (representation 310) so as to indicate a direction of the respective air traffic element from the designated perspective (e.g., from the cockpit)—or, put another way, to indicate where that traffic element could be expected to be seen (under ideal viewing conditions, or better) from that perspective.

The representation 312 generated by processing unit 110 and displayed on display 120 can also be shaped and/or sized, relative to the 3D representation 310, to indicate the real-world position, size and/or shape of the respective traffic element—taking into account any error (determined as discussed above) in size, position, direction, and so forth. Thus, by way of example, in FIG. 3, the representation 312 is shaped and sized to indicate the position of the approaching aircraft, taking errors in determination of same. That representation is, here, a pyramidal frustum (or truncated pyramid) centered about the estimated position of the approaching aircraft, e.g., as determined by the array of sensors or apparatus 130 and/or calculated by processing unit 110 in view thereof. The outer boundaries of that pyramidal frustum indicate estimated errors in position.

As noted, the representation 312 can be shaped to indicate the shape of the respective air traffic element, e.g., the shape of a generic oncoming airplane and/or of the specific type of the approaching craft (e.g., as determined from a database lookup in view of the identification of that craft discerned by sensors and apparatus 130). However, where, as here, estimated errors in position are large, they dominate the shape of the representation 312: hence, the pyramidal frustum.

The representation 312 generated by processing unit 110 and displayed on display 120 can also be colored, shaded or otherwise demarked (e.g., with bold, dashed, blinking or other borders or fill, by way of example) to indicate a severity of risk posed by the respective traffic element. (In addition, in some embodiments, the relative bearing and/or distance can be shown adjacent each representation 312). In the illustrated embodiment, that severity is a function of the relative distance, direction and altitude of the respective traffic element vis-a-vis the host aircraft; though, in other embodiments, other factors can be taken into account (e.g., the type, speed, and/or predicted flight path of the respective element, all by way of example).

Figure 4:
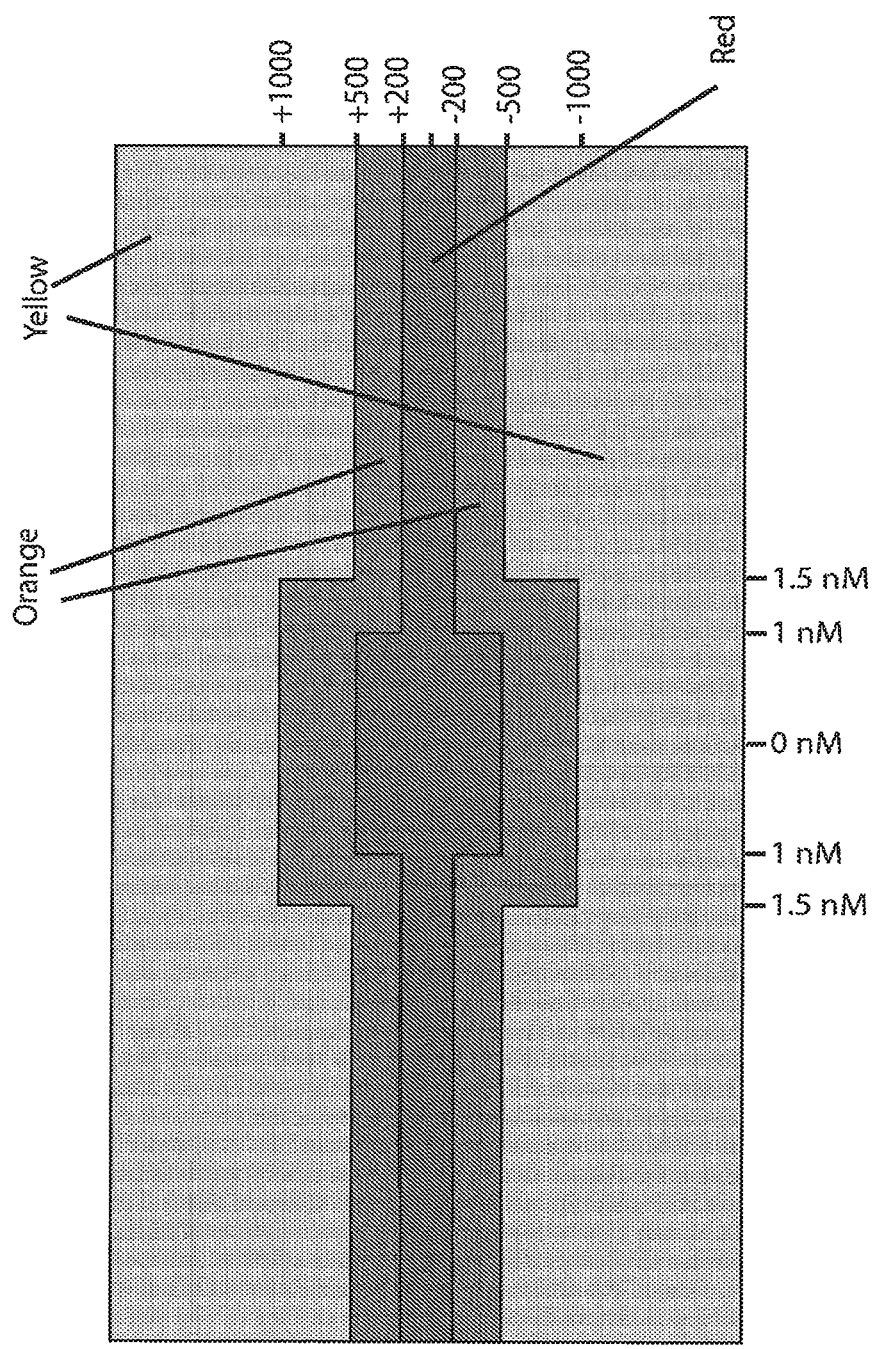
FIG. 4 depicts a threat-level coloration function used in practice of the invention.

More particularly, in the illustrated embodiment, the representation 312 is colored as a function of the relative distances and altitude differences, as indicated in FIG. 4. Broadly speaking, if a respective traffic element is significantly further away (e.g., in nautical miles) and significantly higher or lower in altitude, its representation will be colored yellow. If it is somewhat closer, orange. And, still closer, red. Of course, these colors and the particular segmentation discussed below are all by way of example. Moreover, for sake of convenience, these colors are represented in black-and-white (or grayscale) on the attached drawing.

Those skilled in the art will readily appreciate how to determine the coloration function represented by FIG. 4. Generally speaking, in the drawing, the rectangles represent 20 degrees (10 degrees on each side), the height is 300 feet (150 feet below and above), and 0.6 nautical miles depth (0.3 on each side). However, referring to the drawing, by way of example, if the respective traffic element differs by more than 1000 feet in altitude (as indicated by the vertical axis of the drawing) from the host aircraft, or if it differs by more than 500 feet in altitude and is more than 1.5 nautical miles away (as indicated by the horizontal axis of the drawing), then the processing unit generates the representation 312 in yellow. Likewise, if the altitude difference is between 500-1000 feet and the respective traffic element is under 1.5 nautical miles away from the host aircraft, then the processing unit generates the representation 312 in orange. This is also true if the altitude difference is between 200-500 feet and the respective traffic element is more than 1.5 nautical miles away from the host aircraft.

In the illustrated embodiment, the processing unit 110 does not generate and/or colorize (or otherwise demark) representations 312 of traffic elements that fall outside designated ranges of distance, altitude difference, direction and so forth. For example, it does not generate representations for traffic elements that fall outside the angular field of view of a viewer from the designated perspective (though, it may generate and colorize representations for traffic elements within the angular field of view, but at distances beyond what can be seen by a normal-sighted pilot). Moreover, it does not colorize representations that fall inside that field of view, but that are at altitude differences of more than, say, 2500-3000 feet; distances of more than, say, 15-20 miles, and/or that fall outside a hypothetical cone of, say, 45° with a focal point at the host aircraft cockpit and aligned with that craft's flight path—all by way of example.

It will be appreciated, of course, that the coloration function shown in FIG. 4 is merely by way of example and that other functions can be used instead or in addition.

Indeed, while in the illustrated embodiment, the representation 312 of air traffic in the vicinity of the host aircraft is itself a 3D representation, in other embodiments in can be of lower dimension, such as a 2D symbol that is sized, shaped and positioned as discussed above or otherwise (e.g., the symbol can be positioned on the estimated location of the respective traffic element, with no indication of its size, shape, errors, etc.). The representation can also be of higher dimension, e.g., showing estimated motion of the traffic or conflict relative to the 3D representation of airspace and geography.

As will be appreciated in regard to FIG. 3, in the illustrated embodiment, the processing unit 110 drives the display 120 to generate the depicted information and representations in real-time, although other embodiments may do otherwise (e.g., storing such depictions for later retrieval and display). Thus, the depictions change in real-time, as the host aircraft and traffic move, converge, diverge or otherwise. For example, as the host craft converges on an element of air traffic, the severity level can change from yellow to orange to red and/or the representation of that element can grow in size or change in shape as the processing unit discerns additional information about the traffic element.

Described herein are systems and methods of operation meeting the objectives set forth above. Those skilled in the art will appreciate that the embodiments presented herein are merely examples and that other embodiments, incorporating changes thereto, fall within the scope of the invention.

Thus, for example, although the discussion above largely centers on depiction of potential traffic conflicts in-flight, the teachings hereof may be applied during take-off and landing, as well (e.g., depicting not only potential traffic conflicts that are in the air, but also those on runways).

Still further, it will be appreciated that, although the teachings above largely focus on air traffic and other transient traffic conflicts, they may be applied in connection with other objects (e.g., mountains, buildings, etc.) and events (e.g., micro-weather patterns) that could interfere with host aircraft operation.

Yet still further, it will be appreciated that in addition to and/or in lieu of generating displays of air traffic in the manner shown in connection with representation 312, the processing unit 110 or other functionality can signal audible alerts (e.g., as oncoming air traffic becomes a more serious threat) and/or initiate evasive action.

In view of the foregoing, what I claim is:

1. An aviation navigational system for use with an aerial vehicle, comprising:
    a display;
    a database containing a plurality of aircraft identification codes, each identification code being associated with the type, size and shape of one of a plurality of aircraft;
    a sensor configured to detect a potential conflict within the airspace and a location thereof in the airspace;
    a processor coupled to the display and in operable communication with the database and the sensor, the processor configured to drive the display to generate a three-dimensional graphical representation of airspace in a vicinity of the aerial vehicle and to generate a three dimensional graphical representation of the detected one potential conflict at the location in the airspace,
        wherein the three dimensional graphical representation of the detected one potential conflict comprises a similitude of a potential conflict selected based at least in part on one of the plurality of aircraft identification codes determined by the processor and includes a pyramidal frustum centered about an estimated location of the potential conflict, a distance between outer boundaries of the frustum indicating an estimated error in the location.

2. The aviation navigational system of claim 1, wherein the three-dimensional graphical representation of airspace is from a perspective of a viewer on the aerial vehicle.

3. The aviation navigational system of claim 1, wherein the three-dimensional graphical representation of airspace is a synthetic 3D image of the airspace as it would appear to the viewer from the perspective on the aerial vehicle.

4. The aviation navigational system of claim 1, wherein the potential conflict comprises any of air traffic and other potential traffic conflicts in the vicinity of the aerial vehicle.

5. The aviation navigational system of claim 4, wherein the other potential traffic conflicts comprise any of a microweather pattern, a bird migration, an air show, a restricted air space, a geographic formation, and a man made formation.

6. The aviation navigational system of claim 5, wherein the representation of the potential conflict, includes indicia of one or more characteristics of that potential conflict.

7. The aviation navigational system of claim 6, wherein the characteristics include any of direction, distance, speed, type, size and rate of climb/descent of the potential conflict.

8. The aviation navigational system of claim 6, wherein the processor drives the display with a representation of the potential conflict, which representation includes indicia of one or more characteristics of that potential conflict relative to the aerial vehicle.

9. The aviation navigational system of claim 8, where the indicia includes any of direction, distance, speed, and rate of climb/descent of the potential conflict relative to the aerial vehicle.

10. The aviation navigational system of claim 6, wherein the at least one indicia is based on at least one of a shape and a size of the representation of the potential conflict.

11. The aviation navigational system of claim 10, wherein the processor drives the display with a representation of the potential conflict, which representation is any of shaped and sized to indicate one or more of a direction or size of the potential conflict.

12. The aviation navigational system of claim 1, wherein the processor drives the display with a representation of the potential conflict, which representation includes indicia of a severity of the potential conflict.

13. The aviation navigational system of claim 12, wherein the processor drives the display with a representation of the potential conflict, which representation is any of colored or shaded to indicate a severity of the potential conflict.

14. The aviation navigational system of claim 13, wherein the processor drives the display with a representation of the potential conflict, which representation is:
 a first color for a potential conflict that is any of further away, or higher or lower in altitude relative to aerial vehicle,
 a second color for a potential conflict that is closer to the aerial vehicle, and
 a third color for a potential conflict that is still closer to the aerial vehicle.

15. The aviation navigational system of claim 1, wherein the processor is configured to provide a representation of a projected route of the aerial vehicle along with the airspace representation.

16. The aviation navigational system of claim 1, further comprising:
 at least one sensor coupled with the processor, the at least one sensor providing data for at least one of the three-dimensional graphical representation of airspace and the representation of the at least one potential conflict.

17. A method of representing potential airspace conflicts of an aerial vehicle, comprising:
 with a processor, driving a display to generate a three-dimensional graphical representation of airspace in a vicinity of the aerial vehicle;
 detecting at least one potential conflict within the airspace using a sensor in communication with the processor, and
 driving the display to generate a three dimensional graphical representation, relative to the representation of airspace, of the at least one potential conflict, wherein the three dimensional graphical representation comprises a similitude of the potential conflict selected by the processor at least in part on an aircraft identification code determined by the processor and includes a pyramidal frustum centered about a location of the potential conflict, distance between outer boundaries of which indicate estimated error in a location of the potential conflict.

18. The method of claim 17, wherein the three-dimensional graphical representation of airspace is from a perspective of a viewer on the aerial vehicle.

19. The method of claim 17, wherein the three-dimensional graphical representation of airspace is a synthetic 3D image of the airspace as it would appear to the viewer from the perspective on the aerial vehicle.

20. The method of claim 17, wherein the potential conflict comprises any of air traffic and other potential traffic conflicts in the vicinity of the aerial vehicle.

21. The method of claim 17, comprising driving the display with a representation of the potential conflict, which representation includes indicia of a severity of the potential conflict.

22. The method of claim 21, comprising driving the display with a representation of the potential conflict, which representation includes indicia of one or more characteristics of that potential conflict.

23. The method of claim 22, wherein the characteristics include any of direction, distance, speed, type, size and rate of climb/descent of the potential conflict.

24. The method of claim 17, comprising driving the display with a representation of the potential conflict, which representation includes indicia of one or more characteristics of that potential conflict relative to the aerial vehicle.

25. The method of claim 24, wherein the indicia includes any of direction, distance, speed, and rate of climb/descent of the potential conflict relative to the aerial vehicle.

* * * * *